(12) United States Patent
Creamer et al.

(10) Patent No.: US 7,457,395 B2
(45) Date of Patent: Nov. 25, 2008

(54) DYNAMIC ALLOCATION OF VOICE PORTS AND MENU OPTIONS IN AN INTERACTIVE VOICE RECOGNITION SYSTEM

(75) Inventors: Thomas E. Creamer, Boca Raton, FL (US); Brent L. Davis, Deerfield Beach, FL (US); Peeyush Jaiswal, Boca Raton, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 10/736,029

(22) Filed: Dec. 15, 2003

(65) Prior Publication Data

US 2005/0129195 A1    Jun. 16, 2005

(51) Int. Cl.
H04M 1/64    (2006.01)

(52) U.S. Cl. .............. 379/88.01; 379/88.02; 379/88.04; 379/88.06; 379/88.18; 379/88.22; 381/110; 434/321

(58) Field of Classification Search .............. 379/88.01, 379/88.02, 88.04, 88.06, 88.18, 88.22; 434/321; 381/110
See application file for complete search history.

(56) References Cited

U.S. PATENT DOCUMENTS

| | | | |
|---|---|---|---|
| 5,982,863 A | 11/1999 | Smiley et al. | |
| 6,061,433 A * | 5/2000 | Polcyn et al. | 379/93.12 |
| 6,192,112 B1 | 2/2001 | Rapaport et al. | |
| 6,295,342 B1 | 9/2001 | Kaminsky | |
| 6,389,398 B1 * | 5/2002 | Lustgarten et al. | 704/275 |
| 6,405,170 B1 * | 6/2002 | Phillips et al. | 704/270 |
| 6,456,699 B1 | 9/2002 | Burg et al. | |
| 6,459,776 B1 | 10/2002 | Aktas et al. | |
| 6,460,057 B1 | 10/2002 | Butler et al. | |
| 6,463,130 B1 * | 10/2002 | Malik | 379/88.22 |
| 6,487,277 B2 * | 11/2002 | Beyda et al. | 379/88.01 |
| 6,810,111 B1 * | 10/2004 | Hunter et al. | 379/1.02 |
| 7,065,201 B2 * | 6/2006 | Bushey et al. | 379/265.01 |
| 7,076,049 B2 * | 7/2006 | Bushey et al. | 379/265.01 |
| 7,110,949 B2 * | 9/2006 | Bushey et al. | 704/251 |
| 2002/0067821 A1 * | 6/2002 | Benson et al. | 379/265.02 |

* cited by examiner

Primary Examiner—Fan Tsang
Assistant Examiner—Hemant Patel
(74) Attorney, Agent, or Firm—Akerman Senterfitt

(57) ABSTRACT

A method (100) of dynamically assigning a plurality of voice ports and arranging a plurality of menu choice prompting sequences for at least one application includes the step of receiving (102) a plurality of incoming calls and monitoring (104) at least one among a recognition error rate for each menu option and execution path, a success rate for completing a desired transaction and an associated origination number, and monitoring frequently used menu options. In response to the monitoring steps, at least one of the menu choice prompting sequences among the plurality of menu choice prompting sequences can be rearranged (110) and at least one voice port among the plurality of voice ports can be reassigned (114).

14 Claims, 2 Drawing Sheets

10

DYNAMIC ALLOCATION OF VOICE PORTS AND MENU OPTIONS IN AN INTERACTIVE VOICE RECOGNITION SYSTEM

BACKGROUND OF THE INVENTION

1. Technical Field

This invention relates to the field of telecommunications and more particularly to an dynamically modifiable interactive voice response system.

2. Description of the Related Art

When using a interactive voice response (IVR) system, there are two major issues that hamper greater customer or caller satisfaction. First, the assignment and prioritization of voice ports and second, a proper menu choice prompting sequence. In other words, if an IVR menu has several choices, which choice should be first, second and so forth is not necessarily given much thought after implementation. Existing solutions basically rely upon the past statistics like a call duration, and possibly use human factors expertise and business needs to decide the menu option sequence of presentation apriori.

Several references discuss IVR systems and tailoring or customization of menus of individual callers. For example, U.S. Pat. No. 6,487,277 to Beyda, et al. discusses tailoring the menu for an individual caller by monitoring the caller's pattern of prompt selection. U.S. Pat. No. 6,459,776 to Aktas, et al. discusses another system where individual caller profiles are personalized with different messages and interfaces. None of the existing solutions continually monitor incoming calls and dynamically modify menu choices and sequences and assignment of voice ports in an interactive voice response system. Nor do any of the existing systems change sequences menu choices and prompts on a global basis for all callers based on real-time data.

SUMMARY OF THE INVENTION

Embodiments in accordance with the invention can include a new method and system that can use a software service which can reside on the IVR system and continually monitors incoming calls as the applications are executed. As information is collected, such information can be used to dynamically modify the application's menu structure and optionally or alternatively re-prioritize the assignment of voice ports.

In a first embodiment in accordance with the invention, a method of dynamically assigning a plurality of voice ports and arranging a plurality of menu choice prompting sequences for at least one application includes the steps of receiving a plurality of incoming calls and monitoring at least one among a recognition error rate for each menu option and execution path, a success rate for completing a desired transaction and an associated origination number, and monitoring frequently used menu options. In response to the monitoring steps, at least one of the menu choice prompting sequences among the plurality of menu choice prompting sequences can be rearranged and at least one voice port among the plurality of voice ports can be reassigned.

In a second embodiment in accordance with the invention, an interactive voice response system includes a plurality of voice ports and a processor coupled to the plurality of voice ports. The processor can be programmed to receive a plurality of incoming calls, monitor at least one among a recognition error rate for each menu option and execution path, a success rate for completing a desired transaction and an associated origination number, and frequently used menu options, rearrange at least one of the menu choice prompting sequences among the plurality of menu choice prompting sequences in response to monitoring at least one among the recognition error rate and the frequently used menu options, and re-assign at least one voice port among the plurality of voice ports in response to monitoring the success rate.

In other aspects of the invention, a computer program having a plurality of code sections executable by a machine for causing the machine to perform certain steps is described. The steps can generally include the steps outlined in the first and second embodiments described above.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
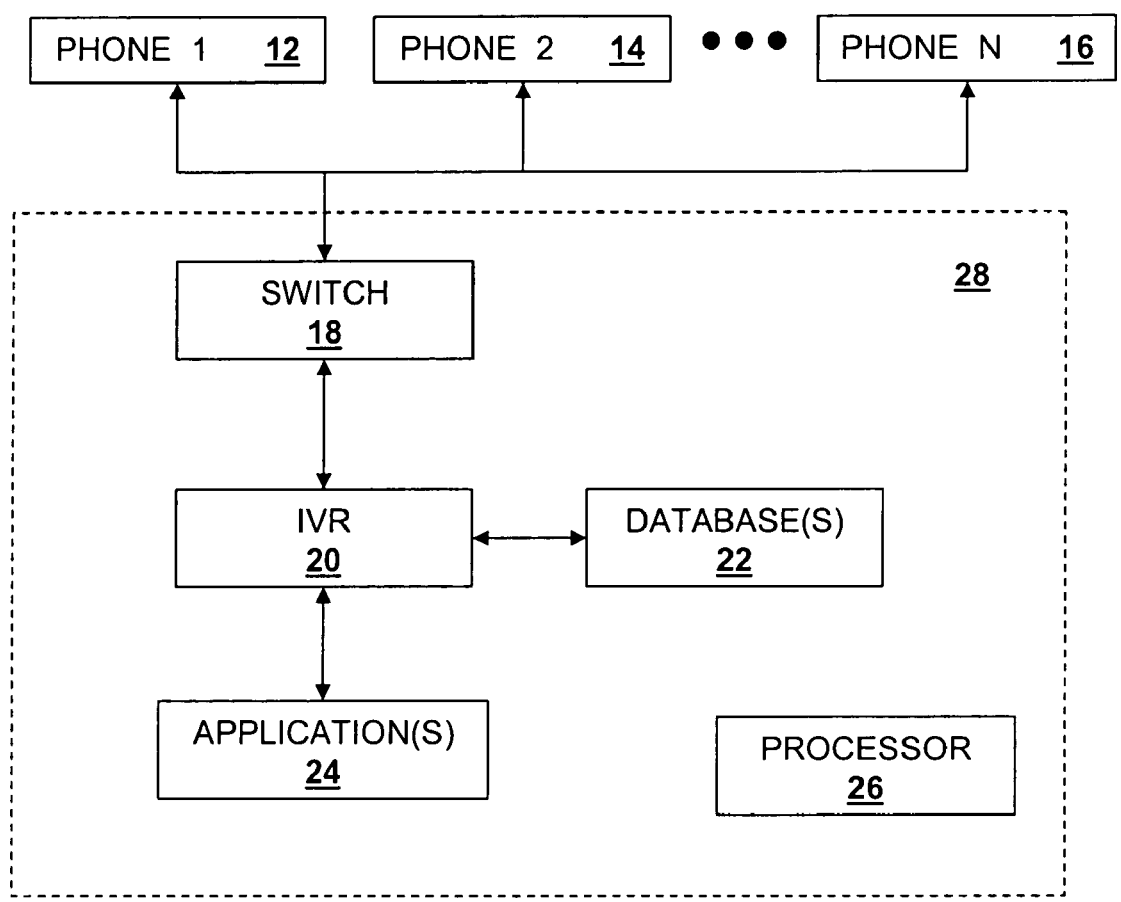
FIG. 1 is a block diagram illustrating an exemplary telecommunications system illustrating an interactive voice response system in accordance with the present invention.

Embodiments in accordance with the invention can include a special software service which can reside on an IVR system that can continually monitor incoming calls as one or more applications are executed. Referring to FIG. 1, an IVR system 10 can include a plurality of phones (12, 14, 16) and a switching element 18 providing the appropriate switching among phones, database(s) 22 and application(s) 24 via the interactive voice response service unit 20. The switch, IVR service unit, databases and applications can reside in separate remote locations or all within a single server or computer 28 having a processor 26.

The IVR system 10 can collect information and use such information to dynamically modify the application's menu structure. Such information can include:

1. A recognition error rate for each menu option and execution path, while calculating its impact on the call duration;
2. Most successful calls (callers that stay in the system to complete the desired transaction) and origination number; and
3. Frequently used menu options among the plurality of menu options in a particular application.

Figure 2:
FIG. 2 is a flow chart illustrating a method in accordance with the present invention.
Figure 2:
Figure 2:
Figure 2:
Figure 2:
Figure 2:
Figure 2:
Figure 2:
Figure 2:

With reference to FIG. 2, a flow chart illustrating a method 100 of dynamically assigning a plurality of voice ports and arranging a plurality of menu choice prompting sequences for at least one application is shown. The method 100 can receive a plurality of incoming calls at step 102, monitor at least one among a recognition error rate for each menu option and execution path, a success rate for completing a desired transaction and an associated origination number, and frequently used menu options at step 104. The monitoring step 104 can optionally include the step 106 of monitoring the recognition error rate for each menu option and execution path while calculating the impact of the recognition error rate on a call duration. Thus, menu options and execution paths will be determined that ideally provide the least number of voice recognition errors and the shortest call duration. Note that the ideal scenario is not the only factor considered and that other factors may justify menu options and execution paths that are not necessarily the ones providing the least recognition errors or the shortest call duration. For example, the monitoring step 104 can also optionally include the step 108 of monitoring callers that stay on an application and complete a desired transaction. Furthermore, step 108 can further monitor revenue and a duration of a given transaction from a given caller or origination number. The method 100 can further rearrange at least one of the menu choice prompting sequences among the plurality of menu choice prompting sequences at step 110 in response to the monitoring step. The menu choice prompting sequences at step 112 can optionally be rearranged in real-time based on the recognition error rate and the frequently used menu options. Thus, a system using this method can dynamically, in real-time, arrange the menu options in such a way that the most successful one will be spoken/presented first. Additionally, the method 100 can include the step of re-assigning at least one voice port among the plurality of voice ports at step 114 in response to the monitoring step. Thus, a system using the method 100 can give callers with better success rates higher priority when assigning a voice port to a caller at step 116. That way a successful dealer will be able to get more calls in and through their system. Also, if the IVR system has more than one IVR application running on it, the IVR application which has the most speech recognition success rate will get a higher priority when assigning the voice ports. As shown at step 118, the method 100 can dynamically assign voice ports and arrange menu choice prompting sequences for a system having one or more applications. The overall impact will be that more successful calls will go through the IVR system and hopefully result in greater revenue.

In one exemplary hypothetical scenario, many callers to an airline reservation system can monitor recognition error rates for each menu option and execution path on a global basis where providing a number of language menu options to callers increases overall throughput for calls from one local area for a period of time and might otherwise burden the system with unnecessary menu prompts in another local area or period of time. For example, providing both a Spanish and English menu option prompt can lower voice recognition error rates and increase throughput in an area having many Spanish speakers, yet unnecessarily burden a system that rarely receives calls from Spanish speakers. Thus, a system in accordance with the present invention would monitor such statistics and make global decisions whether to provide such prompts in an effort to provide greater overall throughput. Furthermore, callers that generate greater revenue in shorter call durations can be tracked and provided higher priority to voice ports. Of course, such a system would not ignore new callers or potential customers and provide unrecognized callers some level of priority over callers that have a history of unsuccessful transactions or extremely long call durations. Also, such a system having multiple applications would likely give greater priority to callers using an application for booking a flight as opposed to an application that merely allows a caller make reservations or confirm a reservation. In contrast to existing systems that personalize or customize prompts for each and every caller, embodiments in accordance with the present invention dynamically revises the menu choice prompting sequences and reassigns voice ports in an effort to enhance overall throughput and revenue for an owner or user of such a system such as a call center.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of dynamically assigning a plurality of voice ports and arranging a plurality of menu choice prompting sequences for at least one application, comprising the steps of:

receiving a plurality of incoming calls;

monitoring at least one among a recognition error rate for each menu option and execution path, a success rate for completing a desired transaction and an associated origination number, and frequently used menu options; and in response to the monitoring step, rearranging at least one of the menu choice prompting sequences among the plurality of menu choice prompting sequences and re-assigning at least one voice port among the plurality of voice ports, wherein the plurality of voice ports are dynamically assigned, and the plurality of menu choice prompting sequences are dynamically arranged for an interactive voice response system having a plurality of applications, wherein greater priority is assigned to voice ports using an application with a greater speech recognition success rate than other applications among the plurality of applications on the interactive voice response system.

2. The method of claim 1, wherein the step of monitoring the recognition error rate for each menu option and execution path is done while calculating the impact of the recognition error rate on a call duration.

3. The method of claim 1, wherein the step of monitoring the success rate comprises the step of monitoring callers that stay on the application and complete the desired transaction, monitoring revenue from a given caller, and monitoring duration of a transaction from the given caller or the associated origination number.

4. The method of claim 1, wherein the step of rearranging menu choice prompting sequences comprises the step of rearranging menu choice prompting sequences in real-time based on the recognition error rate and the frequently used menu options.

5. The method of claim 1, wherein the step of re-assigning voice ports comprises the step of providing greater priority to at least one of the plurality of voice ports based on the success rate.

6. An interactive voice response system, comprising:

a plurality of voice ports; and a processor coupled to the voice ports in the interactive voice response system, the processor programmed to:

receive a plurality of incoming calls;

monitor at least one among a recognition error rate for each menu option and execution path, a success rate for completing a desired transaction and an associated origination number, and frequently used menu options;

rearrange at least one of the menu choice prompting sequences among the plurality of menu choice prompting sequences in response to monitoring at least one among the recognition error rate and the frequently used menu options; and re-assign at least one voice port among the plurality of voice ports in response to monitoring the success rate;

wherein the processor dynamically assigns the plurality of voice ports and arranges the plurality of menu choice prompting sequences for an interactive voice response system having a plurality of applications;

wherein the processor further assigns greater priority to voice ports using an application with a greater speech recognition success rate than other applications among the plurality of applications on the interactive voice response system.

7. The system of claim 6, wherein the processors monitors the recognition error rate for each menu option and execution path while calculating the impact of the recognition error rate on a call duration.

8. The system of claim 6, wherein the processor monitors callers that stay on the system and complete the desired transaction, monitors revenue from a given caller, and monitors duration of a transaction from the given caller or the associated origination number.

9. The system of claim 6, wherein the processor rearranges menu choice prompting sequences by rearranging menu choice prompting sequences in real-time based on the recognition error rate and the frequently used menu options.

10. The system of claim 6, wherein the processor re-assigns voice ports by providing greater priority to at least one of the plurality of voice ports based on the success rate.

11. A machine-readable storage, having stored thereon a computer program having a plurality of code sections executable by a machine for causing the machine to perform the steps of:

receiving a plurality of incoming calls;

monitoring at least one among a recognition error rate for each menu option and execution path, a success rate for completing a desired transaction and an associated origination number, and frequently used menu options;

rearranging at least one of the menu choice prompting sequences among the plurality of menu choice prompting sequences in response to monitoring at least one among the recognition error rate and the frequently used menu options; and re-assigning at least one voice port among the plurality of voice ports in response to monitoring the success rate, wherein voice ports are re-assigned by providing greater priority to at least one of the plurality of voice ports based on the success rate, and wherein greater priority is assigned to voice ports using an application with a greater speech recognition success rate than other applications among the plurality of applications on the interactive voice response system.

12. The machine readable storage of claim 11, wherein the computer program further monitors callers that stay on the system and complete the desired transaction, monitors revenue from a given caller, and monitors duration of a transaction from the given caller or the associated origination number.

13. The machine readable storage of claim 11, wherein the computer program rearranges menu choice prompting sequences by rearranging menu choice prompting sequences in real-time based on the recognition error rate and the frequently used menu options.

14. The machine readable storage of claim 11, wherein the computer program re-assigns voice ports by providing greater priority to at least one of the plurality of voice ports based on the success rate.

* * * * *